(12) United States Patent
Graffia

(10) Patent No.: US 7,637,610 B2
(45) Date of Patent: Dec. 29, 2009

(54) FOLDING EYEGLASSES WITH MULTIFUNCTION CARRYING CASE

(76) Inventor: Anthony R. Graffia, 1610 Colonial Pkwy., Inverness, IL (US) 60067

( * ) Notice: Subject to any disclaimer, the term of this patent is extended or adjusted under 35 U.S.C. 154(b) by 0 days.

(21) Appl. No.: 11/833,778

(22) Filed: Aug. 3, 2007

(65) Prior Publication Data

US 2008/0055539 A1    Mar. 6, 2008

Related U.S. Application Data

(60) Provisional application No. 60/821,363, filed on Aug. 3, 2006.

(51) Int. Cl.
*G02C 1/00* (2006.01)
(52) U.S. Cl. .......... 351/158; 351/63
(58) Field of Classification Search .......... 351/41, 351/63, 158; 206/5, 6; 24/3.8
See application file for complete search history.

(56) References Cited

U.S. PATENT DOCUMENTS 6,447,116 B1 *  9/2002  Chao .......... 351/63

* cited by examiner

*Primary Examiner*—Huy K Mai
(74) *Attorney, Agent, or Firm*—K&L Gates, LLP

(57) ABSTRACT

Folding eyeglasses with a multifunction carrying case are disclosed. The folding eyeglasses may be any type of glasses such as reading glasses, sun glasses, and/or prescription glasses. Preferably, the glasses fold at the bridge of the nose and on each temple. Once folded, the glasses may be placed inside the multifunction carrying case. The carrying case includes a retractable pen and/or a light. The pen may be exposed and/or retracted in any suitable manner. For example, the pen may be spring-loaded and a button may be pushed to expose the pen. In such an instance, the pen may be retracted by pushing it back into the carrying case, thereby resetting the spring. The light may use any suitable light source. For example, the light may use one or more white and/or colored light emitting diodes.

17 Claims, 4 Drawing Sheets

FOLDING EYEGLASSES WITH MULTIFUNCTION CARRYING CASE

PRIORITY CLAIM

This Application claims the benefits of U.S. Provisional Application No. 60/821,363, filed Aug. 3, 2006.

TECHNICAL FIELD

The present application relates in general to eyeglasses and more specifically to folding eyeglasses with a multifunction carrying case.

BACKGROUND

Many people are farsighted and need to carry reading glasses to see things close up. For example, at a restaurant, many people require reading glasses to read the menu, verify the bill, and sign the check. This is especially true in low light conditions (e.g., in a dimly lit restaurant). In fact, some people also carry a small flashlight to increase their visibility in low light conditions.

However, carrying typical reading glasses, a flashlight, and a pen is cumbersome. Each item requires space in the person's pocket or purse, and each item must be located separately. In addition, handling all three items is awkward. For example, holding a flashlight with one hand while signing a check with the other hand does not leave a free hand to hold the check in place.

SUMMARY

To solve each of these problems, folding eyeglasses and an associated multifunction carrying case are disclosed. The glasses fold at the bridge of the nose and on each temple to reduce the transport and storage size of the glasses. The carrying case for the glasses may include a retractable pen. In one embodiment, the pen is spring-loaded. A button may be pushed to expose the pen, and the pen may be retracted by pushing it back into the carrying case, thereby resetting the spring. In addition, the carrying case for the glasses may include a light. In one embodiment, the light uses one or more light emitting diodes.

DETAILED DESCRIPTION

An example of the folding eyeglasses 102 and an example of the multifunction carrying case 104 is illustrated in FIGS. 1-6. The eyeglasses 102 are shown in both the folded and unfolded states. The carrying case 104 includes a retractable pen 106 and a light 108. When the eyeglasses 102 are in the folded state, they may be placed inside the carrying case 104.

Figure 1:
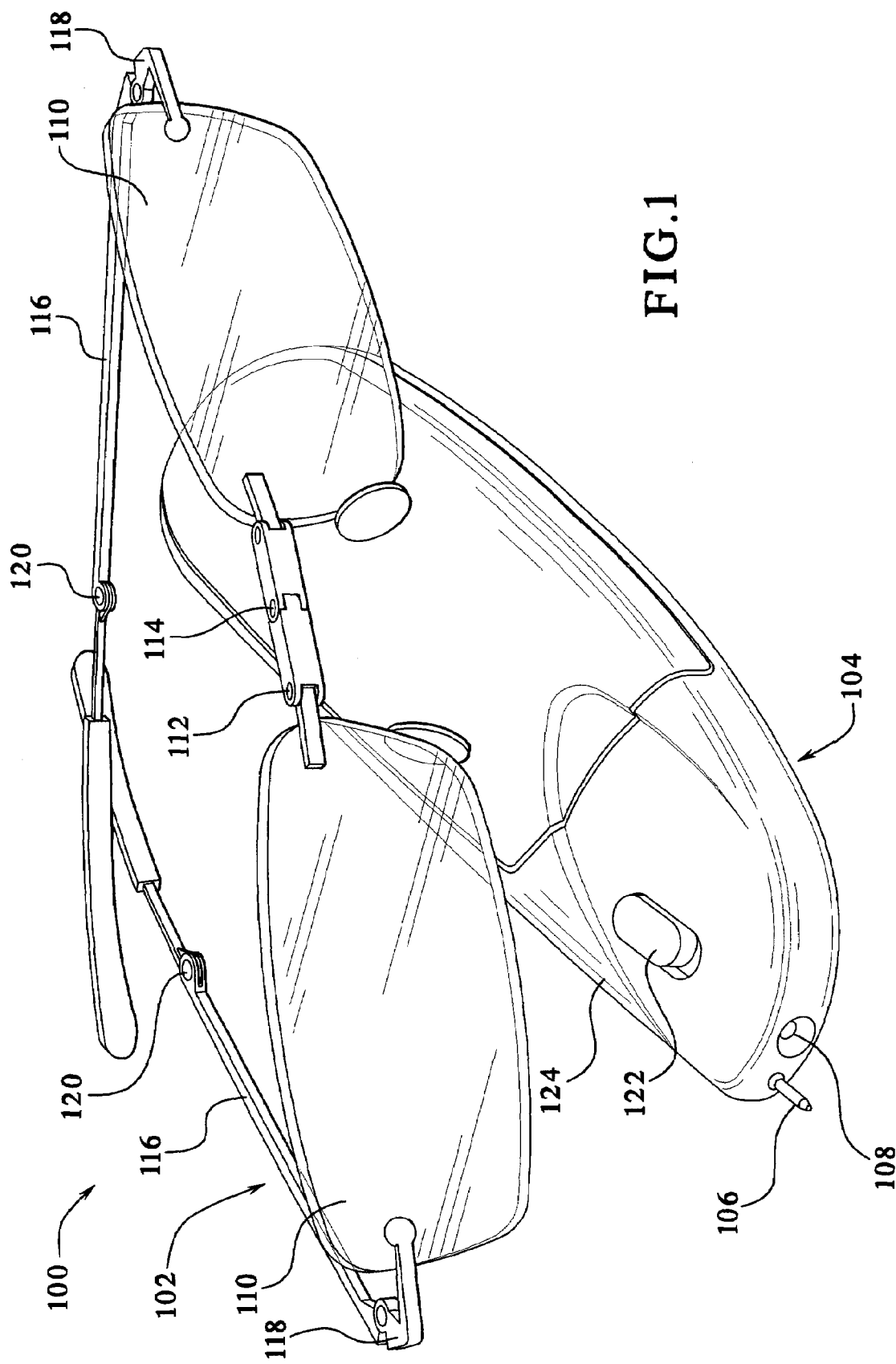
FIG. 1 is an overall view of an example eyeglass and carrying case system with the eyeglasses in an unfolded state, the carrying case in a closed state, the pen in a exposed state, and the light in an off state.

FIG. 1 is an overall view of an example eyeglass and carrying case system 100 with the eyeglasses 102 in an unfolded state, the carrying case 104 in a closed state, the pen 106 in a exposed state, and the light 108 in an off state. In this example, the eyeglasses 102 include two lenses 110 connected together by a bridge 112. The bridge 112 includes a hinge 114. This hinge 114 allows the lenses 110 to be folded together. In addition, the eyeglasses 102 include two temples 116. Each temple is connected to a lens 110 via a hinge 118. These hinges 118 allow the temples 116 to be folded in on the lenses 110. In addition, each temple 116 includes another hinge 120. These hinges 120 allow the temples 116 to be folded in on themselves. In this example, the carrying case 104 includes a button 122. The button 122 may be used to expose and/or retract the retractable pen 106. For example, the retractable pen 106 may be spring loaded.

The light 108 is preferably powered by one or more batteries located inside the carrying case 104. The carrying case 104 may or may not include a door to allow a user to replace the batteries. In one embodiment, the user turns the light 108 on by pressing a button 124 on the carrying case 104. In the same or another embodiment, the light 108 automatically turns on when pressure is applied to the pen 106 (i.e., the user is writing).

Figure 2:
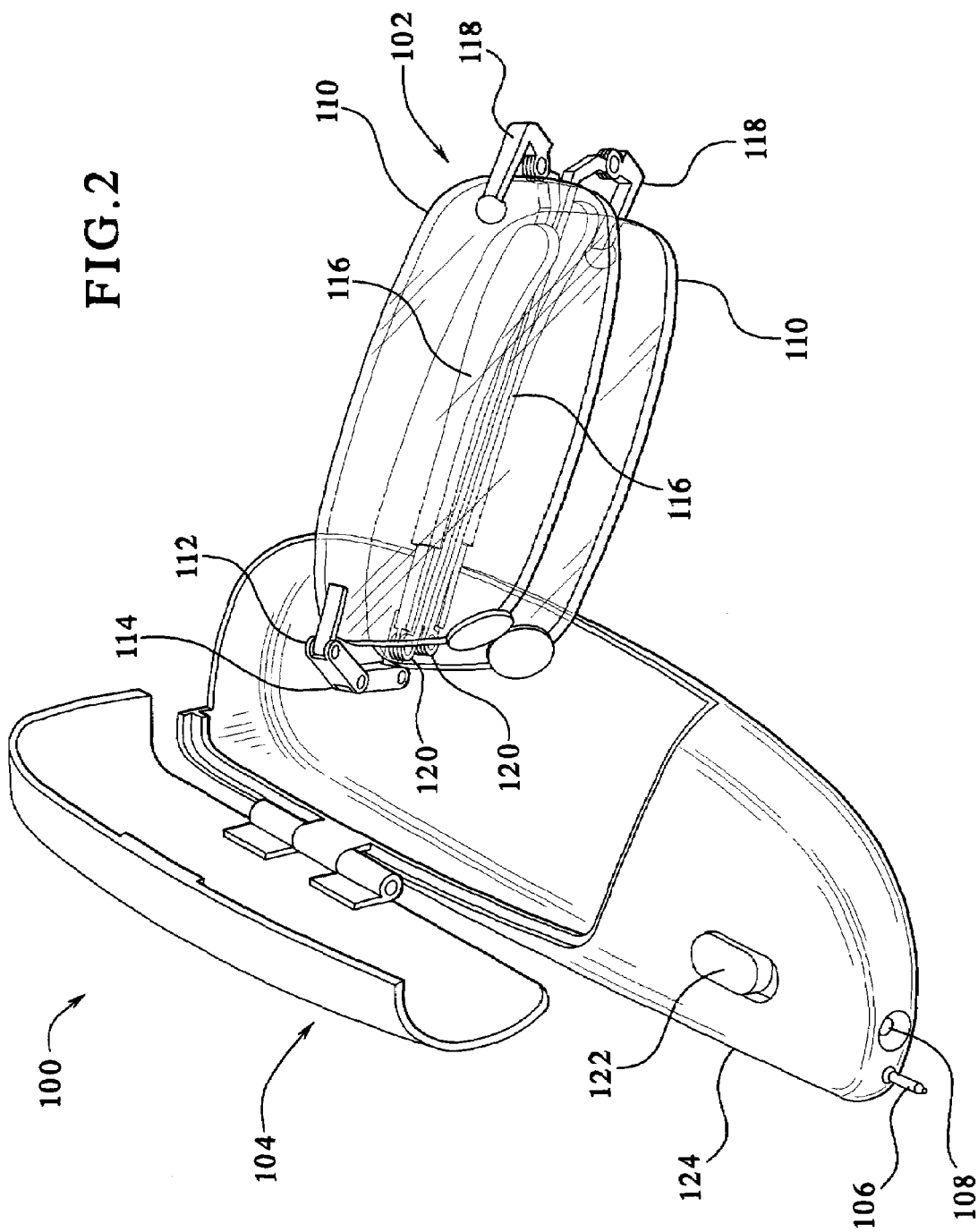
FIG. 2 is another overall view of the example eyeglass and carrying case system with the eyeglasses in a folded state, the carrying case in an open state, the pen in a retracted state, and the light in an off state.

FIG. 2 is another overall view of the example eyeglass and carrying case system 100 with the eyeglasses 102 in a folded state, the carrying case 104 in an open state, the pen 106 in a retracted state, and the light 108 in an off state. As shown in this alternate position and view, the eyeglasses 102 include the two lenses 110 connected together by the bridge 112. The bridge 112 includes the hinge 114, which allows the lenses 110 to be folded together as shown. Again, the eyeglasses 102 include the two temples 116. Each temple is connected to the corresponding lens 110 via the corresponding hinge 118. These hinges 118 allow the temples 116 to be folded in on the lenses 110 as shown. Again, each temple 116 includes another hinge 120. These hinges 120 allow the temples 116 to be folded in on themselves as shown. Again, the carrying case 104 includes the button 122, which may be used to expose and/or retract the retractable pen 106.

Figure 3:
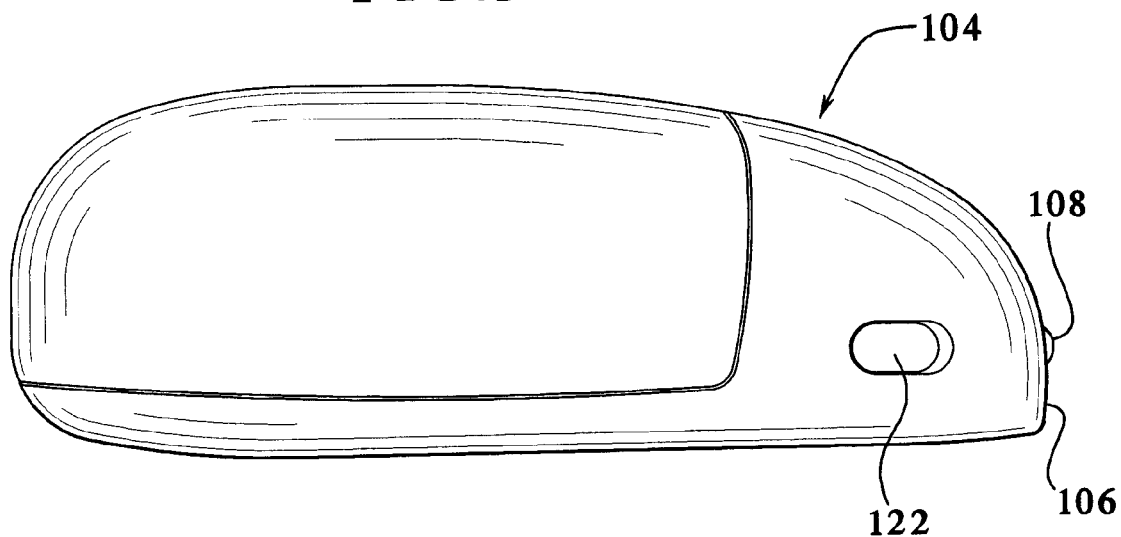
FIG. 3 is a side view of an example carrying case with the carrying case in a closed state, the pen in a retracted state, and the light in an off state.

FIGS. 3-6 show the example carrying case 104 in various states of use. FIG. 3 is a side view of the example carrying case 104 with the carrying case 104 in a closed state, the pen 106 in a retracted state, and the light 108 in an off state. This is typically the state of the carrying case 104 when the system 100 is not in use. For example, a user may place the eyeglasses 102 in the folded state, place the eyeglasses 102 inside the carrying case 104, and place the carrying case 104 inside his/her pocket or purse.

Figure 4:
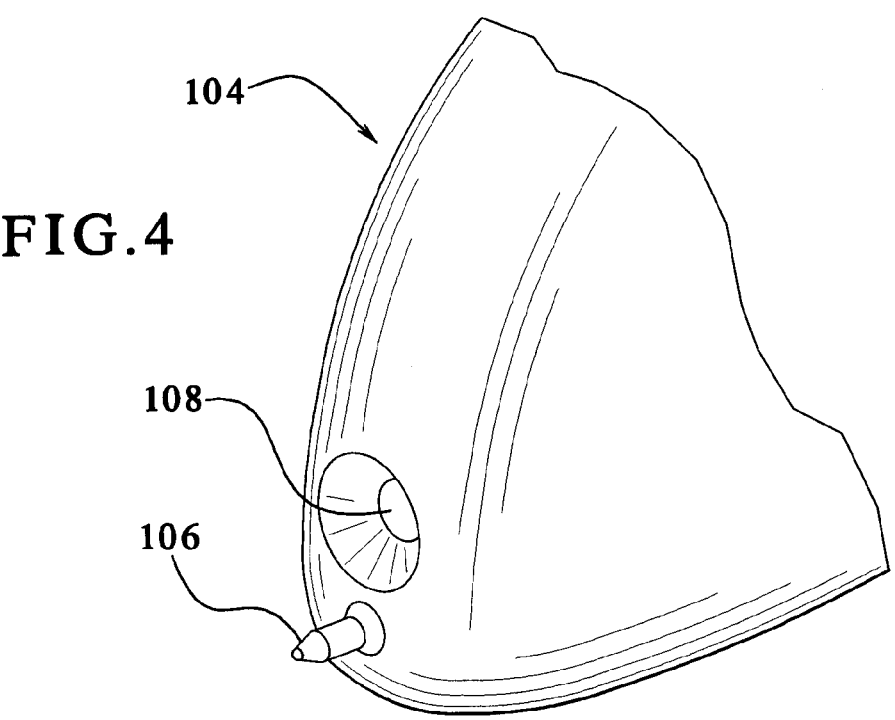
FIG. 4 is a perspective view of the example carrying case with the pen in an exposed state and the light in an on state.
Figure 5:
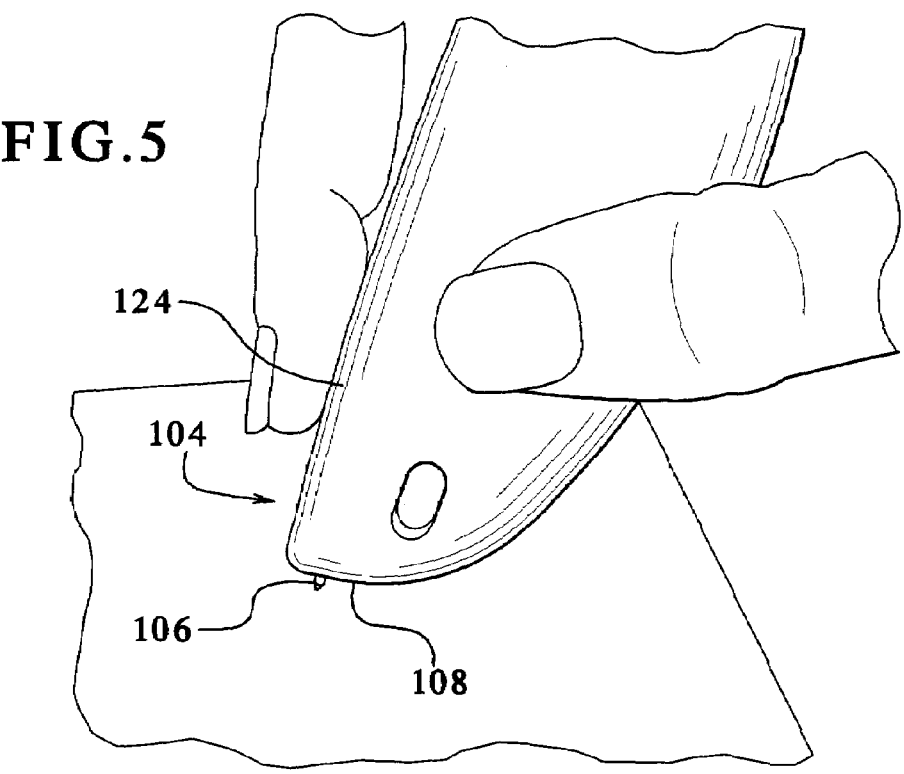
FIG. 5 is an operational view of the example carrying case with the pen in a writing state and the light in an on state.

FIG. 4 is a perspective view of the example carrying case 104 with the pen 106 in an exposed state and the light 108 in an on state. This is typically the state of the carrying case 104 when the system 100 is in full use. For example, a user may remove the eyeglasses 102 from the carrying case 104, place the eyeglasses 102 in the unfolded state, place the eyeglasses 102 on his/her face, place the pen 106 in the exposed state by pressing the button 122, place the light 108 in the on state by pressing another button 124, and use the system 100 to write with light, as shown in FIG. 5.

Figure 6:
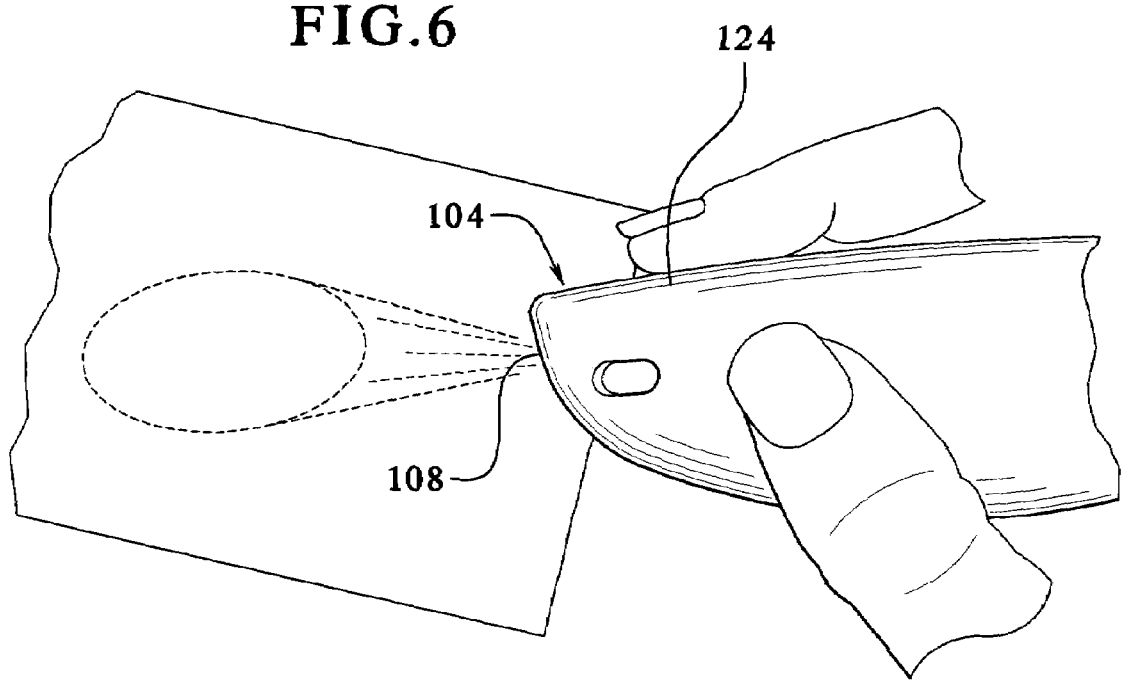
FIG. 6 is an operational view of the example carrying case with the pen in a retracted state and the light in an on state.

FIG. 6 is an operational view of the example carrying case 104 with the pen 106 in a retracted state and the light 108 in an on state. This is one state of the carrying case 104 when the system 100 is in partial use. For example, a user may remove the eyeglasses 102 from the carrying case 104, place the eyeglasses 102 in the unfolded state, place the eyeglasses 102 on his/her face, place the light 108 in the on state by pressing a button 124, and use the system 100 to read (e.g., a menu). Another example of a partial use of the system 100 is to use the pen 106 without the light 108. For example, a user may remove the eyeglasses 102 from the carrying case 104, place the eyeglasses 102 in the unfolded state, place the eyeglasses 102 on his/her face, place the pen 106 in the exposed state by pressing the button 122, and using the system 100 to write.

In summary, persons of ordinary skill in the art will readily appreciate that folding eyeglasses with a multifunction carrying case have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. An eyeglass and carrying case system comprising:
   a pair of eyeglasses, the pair of eyeglasses including
      a hinged bridge operatively connecting a first lens and a second lens;
      a first temple portion including a first hinge and a second hinge, the first hinge operatively connecting the first temple portion and the first lens, the second hinge allowing the first temple portion to be folded between an open length and a closed length, the closed length being shorter than the open length;
      a second temple portion including a third hinge and a fourth hinge, the third hinge operatively connecting the second temple portion and the second lens, the fourth hinge allowing the second temple portion to be folded between the open length and the closed length; and
   a carrying case sized to hold the pair of eyeglasses in a folded state, the carrying case including a writing instrument and a light source, wherein the light source is illuminated when pressure is applied to the writing instrument.

2. The system of claim 1, wherein the writing instrument is a retractable pen.

3. The system of claim 2, wherein the retractable pen is spring loaded.

4. The system of claim 3, wherein the retractable pen is retracted by manually pushing the retractable pen back into the carrying case.

5. The system of claim 4, wherein manually pushing the retractable pen back into the carrying case causes a spring to compress.

6. The system of claim 2, wherein the retractable pen is exposed by pushing a button on the carrying case.

7. The system of claim 6, wherein the retractable pen is retracted by pushing the button on the carrying case.

8. The system of claim 2, wherein the retractable pen is retracted by pushing a button on the carrying case.

9. The system of claim 1, wherein the light source is illuminated via a button.

10. The system of claim 1, wherein the light source is at least one light emitting diode.

11. The system of claim 10, wherein the at least one light emitting diode is a white light emitting diode.

12. The system of claim 1, wherein the carrying case includes a battery compartment.

13. The system of claim 12, wherein the battery compartment includes a door to allow a user to replace at least one battery.

14. The system of claim 12, wherein the battery compartment does not include a door to allow a user to replace a battery.

15. The system of claim 1, wherein the eyeglasses are reading glasses.

16. The system of claim 1, wherein the eyeglasses are sun glasses.

17. The system of claim 1, wherein the eyeglasses are prescription glasses.

* * * * *